United States Patent
Tsujimoto

(10) Patent No.: US 7,568,416 B2
(45) Date of Patent: Aug. 4, 2009

(54) SAW BLADE

(75) Inventor: Susumu Tsujimoto, Isehara (JP)

(73) Assignee: Amada Company, Limited, Kanagawa (JP)

( * ) Notice: Subject to any disclaimer, the term of this patent is extended or adjusted under 35 U.S.C. 154(b) by 322 days.

(21) Appl. No.: 10/416,022

(22) PCT Filed: Nov. 22, 2001

(86) PCT No.: PCT/JP01/10223

§ 371 (c)(1),
(2), (4) Date: May 12, 2003

(87) PCT Pub. No.: WO02/42028

PCT Pub. Date: May 30, 2002

(65) Prior Publication Data

US 2004/0035282 A1    Feb. 26, 2004

(30) Foreign Application Priority Data

Nov. 27, 2000   (JP) ............................... 2000-359937

(51) Int. Cl.
*B27B 33/02* (2006.01)
*B23D 61/02* (2006.01)
*B23D 61/12* (2006.01)

(52) U.S. Cl. ............................. 83/846; 83/847; 83/848; 83/851

(58) Field of Classification Search .................. 83/661, 83/676, 697, 835, 846–852, 854, 855, 836–845, 83/853

See application file for complete search history.

(56) References Cited

U.S. PATENT DOCUMENTS

| 603,128 | A | * | 4/1898 | Clemson | 83/850 |
| 3,292,674 | A | * | 12/1966 | Turner | 83/848 |
| 4,179,967 | A | * | 12/1979 | Clark | 83/846 |
| RE31,433 | E | * | 11/1983 | Clark | 83/846 |
| 4,557,172 | A | * | 12/1985 | Yoneda | 83/848 |
| 4,640,172 | A |  | 2/1987 | Kullmann et al. | 83/835 |
| 4,727,788 | A |  | 3/1988 | Yoshida et al. | 83/848 |

(Continued)

FOREIGN PATENT DOCUMENTS

CH        435678        10/1967

(Continued)

OTHER PUBLICATIONS

English Language Abstract of JP Appln. No. 2000-271817.

(Continued)

*Primary Examiner*—Clark F. Dexter
(74) *Attorney, Agent, or Firm*—Greenblum & Bernstein, P.L.C.

(57) ABSTRACT

A saw blade in which a tooth pattern comprising a first teeth group A and a second teeth group B each having a plurality of set teeth is repeated, wherein the saw blade has at least one or both of the following conditions: a condition in which a tooth height of the second teeth group B is lower than that of the first teeth group A, and a condition in which a set amount of the second teeth group B is smaller than that of the first teeth group A, and wherein the first teeth group A has at least one spur tooth.

5 Claims, 9 Drawing Sheets

U.S. PATENT DOCUMENTS

| | | | |
|---|---|---|---|
| 4,813,324 A * | 3/1989 | Yoshida et al. | 83/848 |
| 4,827,822 A * | 5/1989 | Yoshida et al. | 83/835 |
| 4,958,546 A * | 9/1990 | Yoshida et al. | 83/848 |
| 5,410,935 A * | 5/1995 | Holston et al. | 83/851 |
| 5,603,252 A * | 2/1997 | Hayden, Sr. | 83/851 |
| 2002/0184981 A1 * | 12/2002 | Tsujimoto | 83/846 X |

FOREIGN PATENT DOCUMENTS

| | | |
|---|---|---|
| JP | 64016313 | 1/1989 |
| JP | 2505398 | 4/1996 |
| JP | 10202426 | 8/1998 |
| JP | 00271817 | 10/2000 |

OTHER PUBLICATIONS

English Language Abstract of JP Appln. No. 10-202426.
English Language Abstract of JP Appln. No. 64-016313.

* cited by examiner

FIG.1A
PRIOR ART
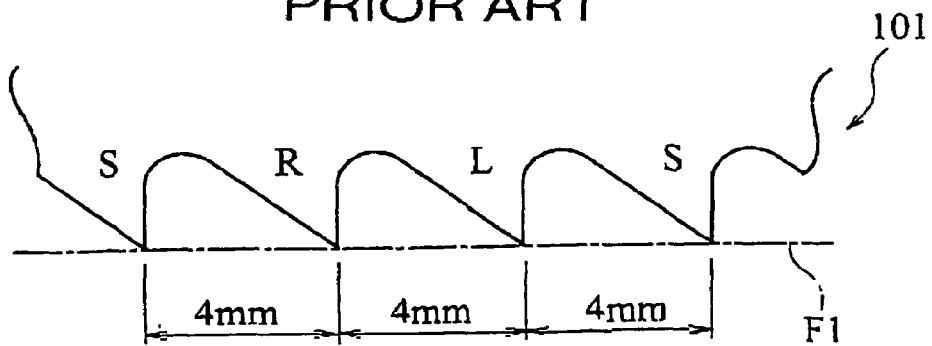
FIG.1B
PRIOR ART
FIG.2A
PRIOR ART
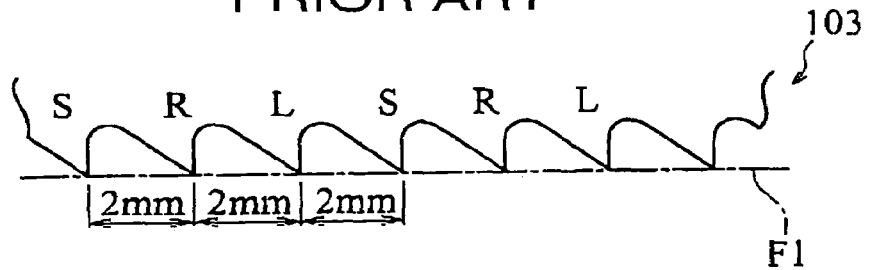
FIG.2B
PRIOR ART

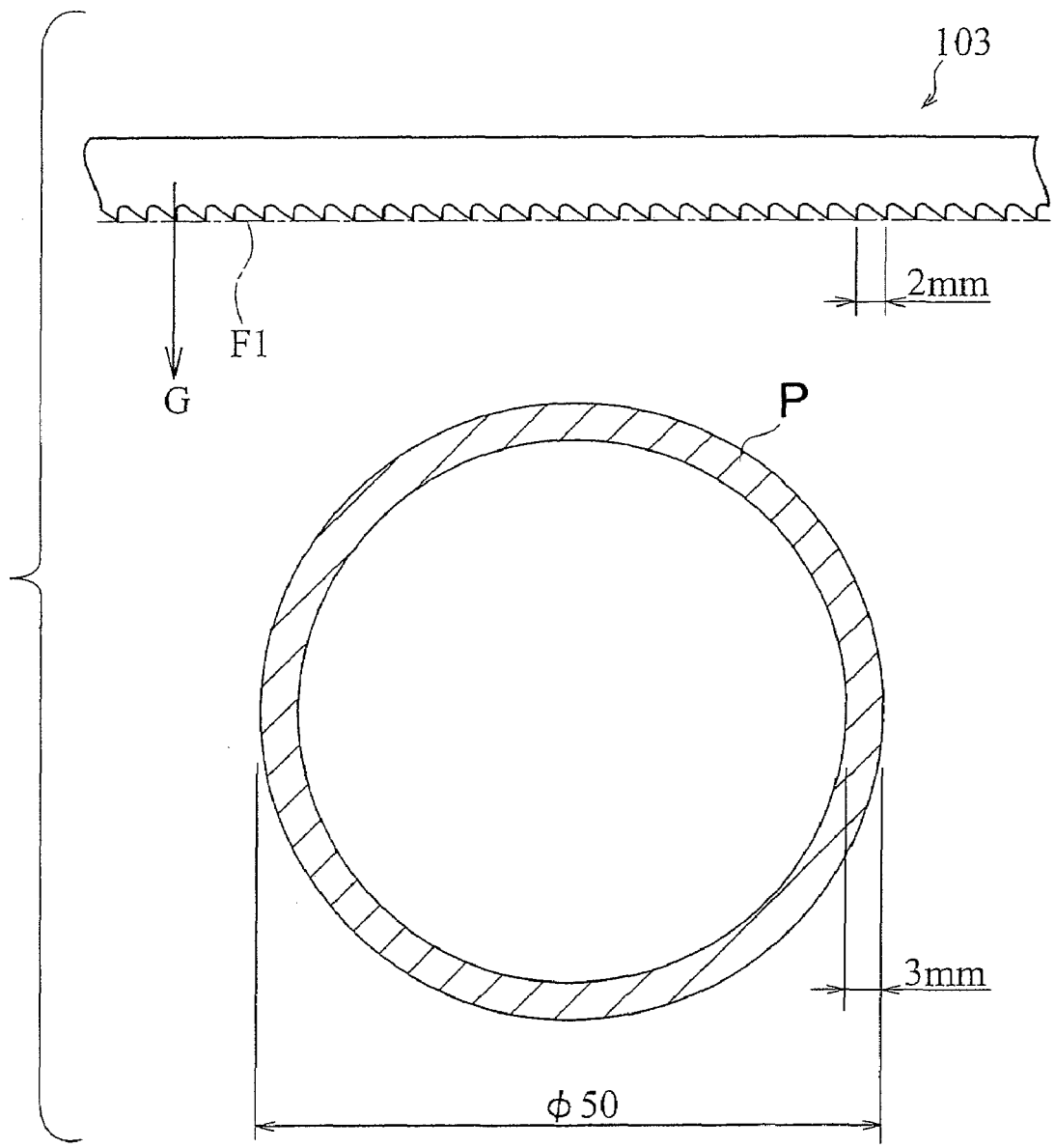

SAW BLADE

TECHNICAL FIELD

The present invention relates to a saw blade such as a band saw, a hacksaw, a circular saw and the like that is a tool for cutting a material to be cut (workpiece) in cutting operation.

BACKGROUND TECHNIQUE

A band mill is conventionally used as an apparatus for cutting a large metal workpiece. In a band saw blade used for the band mill, in order to cope with chatter vibration or noise, a pattern of set teeth is set to various set patterns such as raker set, wave set and straight set, and pitch between the teeth is made non-uniform. In order to cope with difficult-to-machine material such as stainless steel, there is developed a saw blade in which a plurality of teeth of the saw blade are varied in height or the set amount of the plurality of set teeth is varied.

To meet commercial requirements, there have been developed various saw blades such as a saw blade in which angles of tips of saw teeth are variously changed, a back surface of the saw blade is corrugated, or a curve line connecting tips of the teeth of the saw blade is corrugated.

Concerning also a band mill which cuts a metal workpiece for example, various band mills have been developed in accordance with usage of cutting operations. For example, cutting methods of the band mills are roughly divided. There are two kinds of methods, i.e., (1) a case in which a cutting speed is constant irrespective of a cutting length of a workpiece, and (2) a case in which the cutting speed is variable in accordance with the cutting length of a workpiece.

The methods (2) in which the cutting speed is variable in accordance with the cutting length of a workpiece can further be divided into (2-1) a method for controlling back pressure generated in a cylinder using a hydraulic cylinder, (2-2) a method for controlling a flow rate in accordance with cutting resistance using a hydraulic cylinder, (2-3) a CNC controlling method in which a shape of a workpiece is previously input, the cutting length of a workpiece is calculated each time and the cutting speed is changed, (2-4) a CNC controlling method in which a cutting resistance is detected, and the cutting speed is changed in accordance with the cutting resistance, and (2-5) a weight of a housing to which the saw blade is mounted is mechanically adjusted and restrained, and a workpiece is cut by free fall.

Conventionally, band mills such as a small and inexpensive portable band saws are widely used. Generally, the small portable band saw, a lateral type band saw are of the hinge type in which a saw blade housing is vertically swung such as to draw an arc, and the method of (2-5) is frequently used. Such a band mill is called "light-load saw mill" herein after in this specification.

The light-load sawmills in the common market are suitable for cutting a relatively small workpiece in a cutting operation on a building site of steel construction. Although such workpiece shapes are limited to small objects, the kinds of the workpiece shapes vary widely, and cutting operations of workpieces such as different shaped steels, pipes and small-diameter solid materials are carried out.

In the light-load saw mills as described above, as shown in FIGS. 1A and 1B, one set pattern comprises three teeth, i.e., one spur tooth S and a pair of left and right set tooth L and R having a constant set amount in the lateral direction, and this set pattern is repeated. When a solid material W having a diameter of 50 mm is cut using a saw blade 101 having a pitch of 4 mm as shown in FIG. 3, an appropriate cutting operation can be carried out. When a pipe material P having a diameter of 50 mm and a thickness of 3 mm is cut using the same saw blade 101 as shown in FIG. 4, however, there is a problem that the saw blade 101 is prone to be broken off.

This is because that although the pitch of the saw blade 101 is 4 mm, the thickness of the pipe material P is 3 mm and the cutting speed of the saw blade 101 is close to a free fall of a housing load G and thus, if the cutting operation by the saw blade 101 reaches near the center of the pipe material P in this cutting condition, the workpiece P enters between a tip and a tip of the saw blade 101, and abrupt free fall is generated, a cutting amount becomes excessively increased and thus, the teeth are prone to be broken.

As a current method for solving this problem, as shown in FIGS. 2A and 2B, it is common to cut a pipe material P using a saw blade 103 having a pitch smaller than a thickness of the pipe material P. FIG. 5 shows a state in which a pipe material P having a thickness of 3 mm and a diameter of 50 mm is cut using a saw blade 103 (saw blade shown in FIGS. 2A and 2B) having a pitch of 2 mm.

Under this condition, since the pitch of the saw blade 103 is as small as 2 mm with respect to the 3 mm thickness of the pipe material P, even if the saw blade 103 reaches near the center of the pipe material, the workpiece P does not enter between a tip and a tip of the saw blade 103, and abrupt free fall is not generated, an appropriate cutting operation is carried out.

If a solid material W (workpiece shown in FIG. 3) having a diameter of 50 mm is cut using the same saw blade 103, i.e., the saw blade 103 (saw blade shown in FIGS. 2A and 2B) having the pitch of 2 mm, however, since the pitch of the saw blade 103 is sufficiently smaller than the diameter of the workpiece W, abrupt free fall is not generated and the excessive cutting is not generated. However, the number of teeth of the saw blade 103 acting on a cutting length of the workpiece W is large, and a cutting amount of each tooth with respect to the workpiece W becomes small. Therefore, there is a problem that the cutting time becomes long as compared with a case in which a solid material W is cut by the saw blade 101 having the pitch of 4 mm.

For the above-described reason, when a workpiece such as a solid material and a pipe material is cut, there is a problem that it is necessary to exchange saw blades having an appropriate pitch in accordance with shape and size of the workpiece P and it takes time and labor for exchanging the saw blades.

Therefore, various workpieces are cut on building site and the like, and labor for exchanging saw blades having different pitches in accordance with shape and size of workpieces is not negligible. Even if a saw blade having relatively small pitch is previously mounted for the sake of preventing the teeth from being broken, if a workpiece having relatively long cutting length, a problem in which the cutting time becomes long is not negligible.

The present invention has been accomplished to solve the above problems, and it is an object of the invention to provide a saw blade capable of efficiently cutting workpieces having relatively long or small cutting length while preventing the teeth from being broken.

DISCLOSURE OF THE INVENTION

To achieve the above object, a first aspect of the invention provides a saw blade in which a set pattern comprising a combination of a first teeth group having a spur tooth and left and right laterally bent set teeth and a second teeth group having left and right laterally bent saw teeth is appropriately repeated, wherein set amounts of the left and right saw teeth of the second teeth group are smaller than or equal to set amounts of the left and right saw teeth of the first teeth group.

A second aspect of the invention provides a saw blade in which a set pattern comprising a combination of a first teeth group having a spur tooth and left and right laterally bent set teeth and a second teeth group having left and right laterally bent saw teeth is appropriately repeated, wherein a tooth height of the second teeth group is lower than a tooth height of the first teeth group.

According to a third aspect of the invention, in the saw blade of the second aspect, set amounts of the left and right saw teeth of the second teeth group are smaller than or equal to set amounts of the left and right saw teeth of the first teeth group.

A fourth aspect of the invention provides a saw blade in which a set pattern comprising a combination of first and second teeth groups each having at least a spur tooth and a pair of left and right laterally bent set teeth is appropriately repeated, wherein a tooth height of the saw tooth of the second teeth group is lower than a tooth height of the saw tooth of the first teeth group, a tip pitch including a garret of the saw tooth of the second teeth group is smaller than a tip pitch including a garret of the saw tooth of the first teeth group, set amounts of the left and right set teeth of the second teeth group are equal to or smaller than set amounts the left and right set teeth of the first teeth group.

A fifth aspect of the invention provides a saw blade in which a set pattern comprising a combination of a first teeth group having at least a spur tooth and a pair of left and right laterally bent set teeth and a second teeth group having at least a pair of left and right set teeth is appropriately repeated, wherein a tooth height of the saw tooth of the second teeth group is lower than a tooth height of the saw tooth of the first teeth group, a tip pitch including a garret of the saw tooth of the second teeth group is smaller than a tip pitch including a garret of the saw tooth of the first teeth group, set amounts of the left and right set teeth of the second teeth group are equal to or smaller than set amounts the left and right set teeth of the first teeth group.

A saw blade according to a sixth aspect, in the saw blade of any one of the first to fifth aspects, the second teeth group includes a spur tooth, the number of teeth of the first teeth group and the number of teeth of the second teeth group are the same.

A saw blade according to a seventh aspect, in the saw blade of any one of the first to sixth aspects, the number of the left and right set teeth of the first teeth group and the number of left and right set teeth of the second teeth group are the same.

A saw blade according to an eighth aspect, in the saw blade of any one of the first to seventh aspects, the first teeth groups and the second teeth groups are alternately arranged.

A saw blade according to a ninth aspect, in the saw blade of any one of the first to eighth aspects, the number of teeth of the second teeth group is greater than the number of teeth of the first teeth group.

A saw blade according to a tenth aspect, in the saw blade of any one of the first to ninth aspects, the number of teeth of the first teeth group is greater than the number of teeth of the second teeth group.

A saw blade according to an eleventh aspect, in the saw blade of any one of the first to tenth aspects, saw teeth of the left and right set teeth of the first and second teeth group which are bent in the same direction are continuously arranged.

A saw blade according to a twelfth aspect, in the saw blade of any one of the first to tenth aspects, saw teeth of the left and right set teeth of the first and second teeth group which are bent in the same direction are not continuously arranged.

A saw blade according to a thirteenth aspect, in the saw blade of any one of the first to twelfth aspects, pitches between the teeth are not equal to each other.

A saw blade according to a fourteenth aspect, in the saw blade of any one of the first to thirteenth aspects, the non equal pitches are two sizes of pitches.

A saw blade according to a fifteenth aspect, in the saw blade of any one of the first to fourteenth aspects, a height difference between the teeth of the first teeth group and the teeth of the second teeth group is 0.2 mm or less.

A saw blade according to a sixteenth aspect, in the saw blade of any one of the first to fifteenth aspects, a bottom of a garret of the saw tooth of the second teeth group is located closer to a tip than a garret of the saw tooth of the first teeth group.

A saw blade according to a seventeenth aspect, in the saw blade of the fourth or fifth aspect, the saw tooth of the second teeth group is disposed between saw teeth of the first teeth group.

As described above, according to the saw blade of the present invention, the set pattern comprises a combination of the first teeth group having the spur tooth and left and right set teeth having high tooth height, and the second teeth group having the left and right set teeth having set amount smaller than set amount of the set teeth of the first teeth group.

Therefore, it is possible to easily cut a solid material and a pipe material, and to carry out the cutting operation without breaking the teeth, and the above-described conventional problem can be solved.

BRIEF DESCRIPTION OF THE DRAWINGS

FIG. 1A is a front view showing a portion of tip shape of a conventional saw blade.

FIG. 1B is a bottom view showing a portion of the tip shape of the conventional saw blade shown in FIG. 1A.

FIG. 2A is a front view showing a portion of tip shape of a conventional saw blade.

FIG. 2B is a bottom view showing a portion of the tip shape of the conventional saw blade shown in FIG. 2A.

FIG. 5 is an explanatory view of a state in which a pipe material having a thickness of 3 mm is cut by a conventional saw blade having a pitch of 2 mm.

BEST MODE FOR CARRYING OUT THE INVENTION

Figure 3:
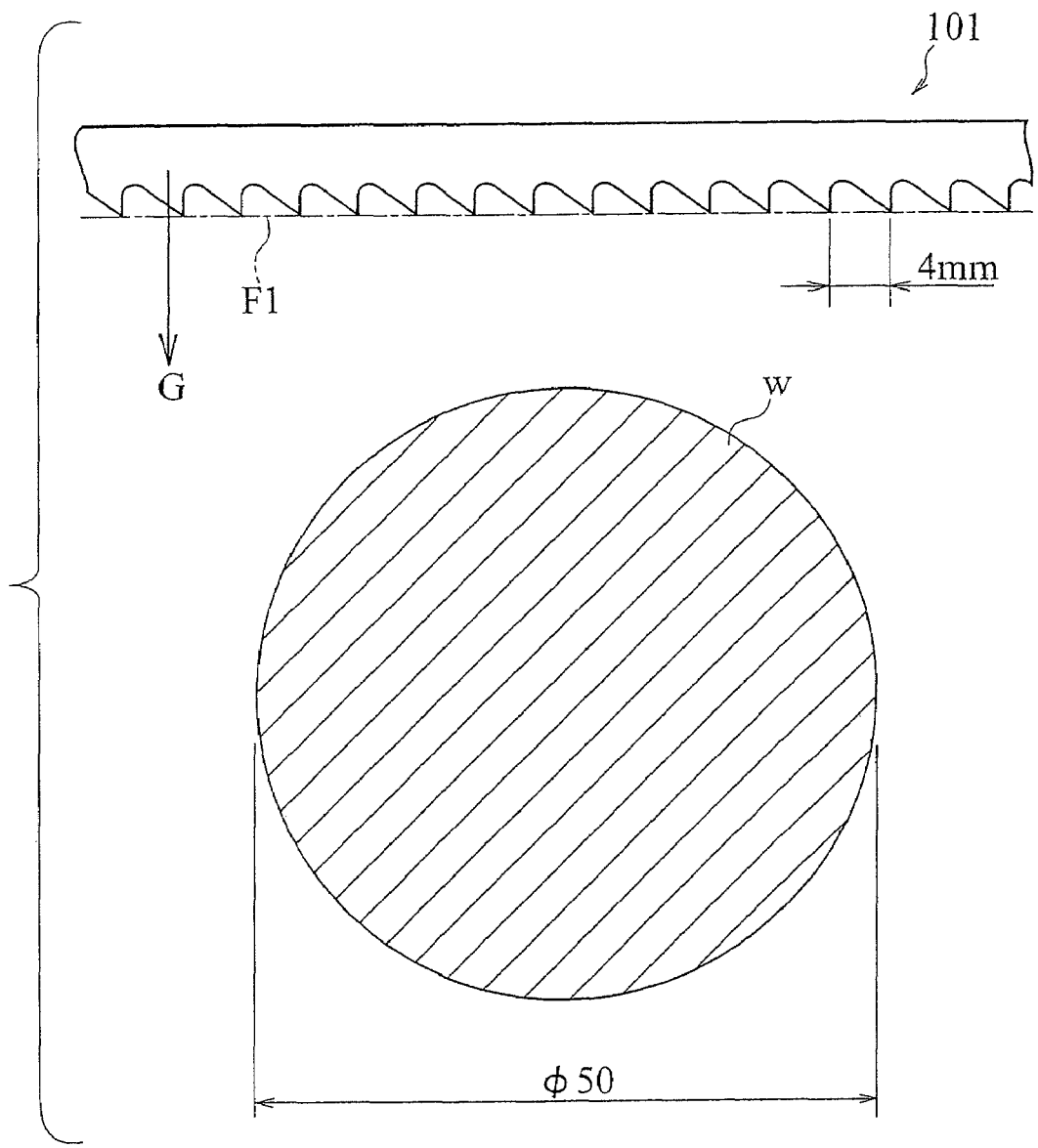
FIG. 3 is an explanatory view of a state in which a solid material is cut by a conventional saw blade having a pitch of 4 mm.
Figure 4:
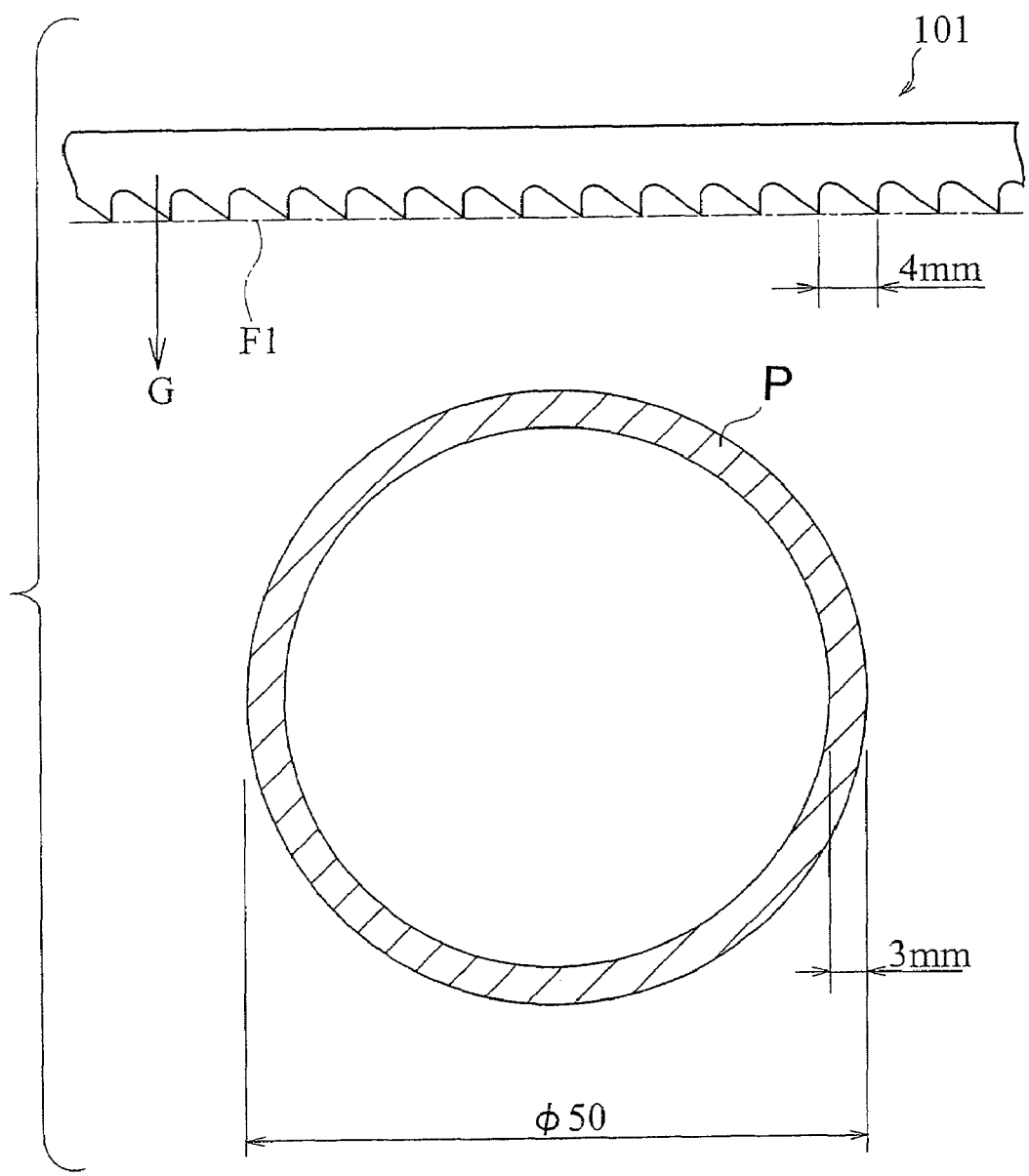
FIG. 4 is an explanatory view of a state in which a pipe material having a thickness of 3 mm is cut by a conventional saw blade having a pitch of 4 mm.

Embodiments of the present invention will be explained using the drawings. A saw blade according to the embodiments cuts workpieces by moving the saw blade in a right direction in the drawings.

Figure 6A:
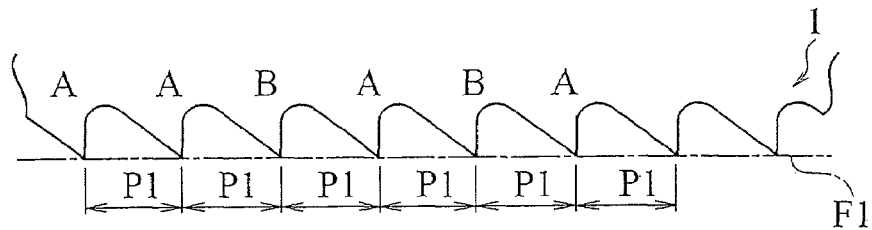
FIG. 6A is a front view showing a tooth pattern of a portion of a saw blade according to a first embodiment of the present invention.
Figure 6B:
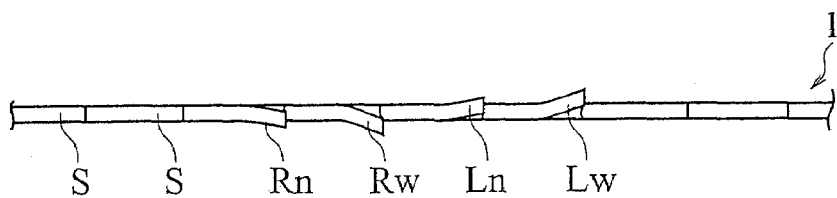
FIG. 6B is a bottom view showing the tooth pattern of the portion of the saw blade shown in FIG. 6A.

Referring to FIGS. 6A and 6B, in a saw blade 1 according to a first embodiment of the present invention, a set pattern of a combination of a first teeth group (saw teeth belonging to the first teeth group are shown with symbols A) and a second teeth group (saw teeth belonging to the second teeth group are shown with symbols B) is repeated appropriately. The first teeth group has a spur tooth S which is not bent in the lateral direction (thickness direction of the saw blade 1) with respect to the saw blade 1 and a pair of left and right set teeth Lw and Rw having a relatively large set amount in the lateral direction (i.e., set width is wide). The second teeth group has a pair of left and right set teeth Ln and Rn having a set amount (i.e., set width is narrow) smaller than the set amount of the left and right set teeth Lw and Rw of the first teeth group A.

The saw blade 1 run from left to right in the drawings to cut a workpiece. In this case, in the cutting operation, the teeth Lw, Ln, Rw, Rn, S and S abut against the workpiece in this order to proceed the cutting operation.

In the saw blade 1 shown in FIGS. 6A and 6B, the first teeth group A comprises four teeth, i.e., the two spur teeth S, and the pair of left and right set teeth Lw and Rw having a relatively large set amount. The second teeth group B comprises two teeth, i.e., the pair of left and right set teeth Ln and Rn having a set amount smaller than the set amount of the left and right set teeth Lw and Rw of the first teeth group A. The first teeth group A and the second teeth group B are combined to form the set pattern. Tip pitches P1 are the same and are set to 2 mm for example.

When a workpiece W such as a solid material shown in FIG. 3 having relatively long cutting length is cut using the saw blade 1 having the above structure, since the set amounts of the left and right set teeth Ln and Rn of the second teeth group B are smaller than those of the left and right set teeth Lw and Rw of the first teeth group A, a force contributing to the cutting operation when the workpiece W is cut such as to widen the cutting groove is small. Since the force is small, the pitch of the saw blade becomes great correspondingly. That is, if the second teeth group B having a smaller force contributing to the cutting operation is ignored, a distance of the set teeth which largely contributes to the cutting operation is a distance between the left set tooth Lw and the right set tooth Rw, and between the right set tooth Rw and the spur tooth S of the first teeth group A which mainly carries out the cutting operation. That is, the effective pitch is P1×2, and it looks as if a saw blade having large pitch (P1×2) cuts the workpiece W. A distance between the spur teeth S and S is the original pitch P1.

Therefore, solid materials shown in FIG. 3 were cut using the saw blade 1 of the present embodiment and the conventional saw blade 103 shown in FIGS. 2A and 2B under the same cutting conditions such as running speeds of band mill and saw blade and cutting loads, and results were compared, and cutting time of the saw blade 1 of the present embodiment was shorter.

At the time of the above cutting operation, the saw blade 1 cut the workpiece W with saw tooth pitch of (P1×2) pitch and the pitch P1, resonance of the saw blade at the time of cutting operation is restrained and noise is restrained. Since the left and right set tooth are equal to each other, the component of force in the lateral direction acting on the saw blade is canceled.

The cutting time is compared including the conventional saw blade 101 shown in FIGS. 1A and 1B, a result is saw blade 101<saw blade 1<saw blade 103, and when a solid material is cut, cutting time is shorter than the conventional saw blade 103 shown in FIGS. 2A and 2B.

If a workpiece P such as a pipe material shown in FIG. 5 is cut using a saw blade 1 shown in FIGS. 6A and 6B, the pitch P1 of the saw blade is as small as 2 mm with respect to 3 mm thickness of the pipe material, and even if the saw blade 1 reaches near the center of the pipe material, the workpiece P does not enter between the tips of the saw blade, and abrupt free fall is not generated, and the workpiece P is appropriately cut without breaking the teeth.

That is, at the time of cutting of a workpiece, when a cutting resistance is large and a cutting speed relatively tends to be small like a case in which a solid material is cut, saw teeth of the first teeth group A mainly cut. When the cutting resistance is relatively small and the cutting speed tends to be relatively large like a case in which a pipe material is cut, both the first teeth group and the second teeth group cut together, and it is possible to efficiently cut a workpiece having relatively long cutting length and a workpiece having small cutting length without breaking the teeth. As a result, labor for exchanging the saw blades in accordance with workpieces can be omitted, and a consumption amount of a saw blade can also be reduced.

Figure 6C:
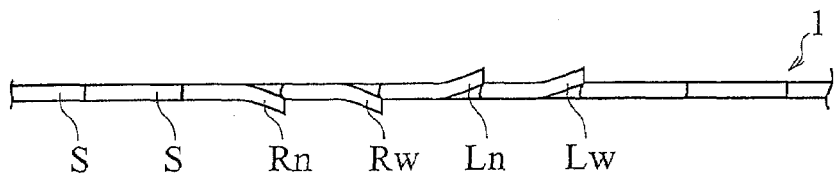
FIG. 6C is a bottom view showing a modification of the tooth pattern of the saw blade shown in FIG. 6B.

As shown in FIG. 6C, it is possible that the set amounts of the left and right set teeth Lw and Rw of the first teeth group A and the set amounts of the set teeth Ln and Rn of the second teeth group B are substantially the same. In this case, the above-described effect can be exhibited, and since the set teeth Ln and Rn of the second teeth group B slightly contribute to the cutting operation, a cut section of a workpiece is shaven, and precision of the cut section is further enhanced.

Figure 7A:
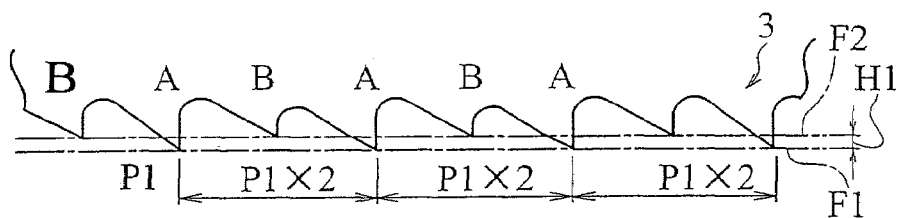
FIG. 7A is a front view showing a tooth pattern of a portion of a saw blade according to a second embodiment of the present invention.
Figure 7B:
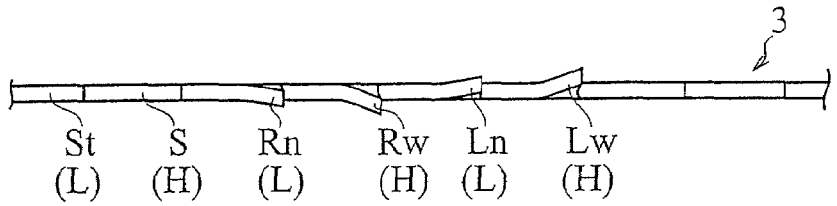
FIG. 7B is a bottom view showing the tooth pattern of the portion of the saw blade shown in FIG. 7A.

FIGS. 7A and 7B show a saw blade 3 of a second embodiment of the invention. In the saw blade 3, there is a height difference H1 between saw teeth corresponding to the first teeth group A and saw teeth corresponding to the second teeth group B, and distances between the saw teeth are equal pitches P1.

In other words, the tips of the spur teeth S, Lw and Rw are arranged such as to coincide with a first phantom line F1 shown with chain line. On the other hand, the tips of the saw teeth St, Ln and Rn are arranged such as to coincide with a second phantom line F2 shown with chain line. A height difference between the first phantom line F1 and the second phantom line F2 corresponds to the height difference H1 of the tooth height of the saw teeth.

Since there is the height difference H1 between the tips of the set teeth S, Lw and Rw and the tips of the saw teeth St, Ln and Rn, depths of garrets thereof are different. That is, the set teeth Ln and Rn belonging to the second teeth group B have low tooth heights, and the front garret (on the right side in the drawings and upstream of the moving direction of the saw blade) is shallower than the garret in front of the saw teeth S, Lw, Rw belonging to the first teeth group A. By making the tooth height lower and the front garret shallower in this manner, the rigidity of the saw tooth belonging to the second teeth group B is enhanced, and bending of the saw tooth in the set bending direction by the cutting resistance when a workpiece is cut by the saw tooth can be restrained, and the cutting ability can be enhanced.

Concerning the height difference between the left and right set teeth of the first teeth group A and the left and right set teeth of the second teeth group B, the tooth height of the set tooth having the small set amount of the second teeth group B is the lowest. In other words, the set tooth having low tooth height has a set amount smaller than that of the set tooth having high tooth height.

More specifically, the first teeth group A comprises a total of three teeth, i.e., the one spur tooth S having high tooth height (as shown with (H)), and the pair of left and right set teeth Lw and Rw having relatively large set amounts and having high tooth height (as shown with (H)). The second teeth group B comprises a total of three teeth, i.e., the one spur tooth St having a smaller tooth height than that of the spur tooth S of the first teeth group A, and the pair of set teeth Ln and Rn having smaller tooth height and smaller set amounts than those of the left and right set teeth Lw and Rw of the first teeth group A. The number of the spur teeth and the left and right set teeth are the same, and one set pattern is constituted by a total of six saw teeth of the first teeth group A and the second teeth group B. The saw teeth of the first teeth group A and the saw teeth of the second teeth group B are disposed alternately.

In the saw blade 3, the height difference H1 between the tips of the saw teeth of the first teeth group A and the saw teeth of the second teeth group B are set to such a degree that when the cutting length is long and cutting resistance in the cutting direction is large and the cutting speed is relatively slow like a case when a solid material shown in FIG. 3 is cut, the cutting operation is mainly carried out by the saw teeth of the first teeth group A, and when the cutting resistance in the cutting direction is small and the cutting speed is prone to be relatively high like a case when a pipe material shown in FIG. 5 is cut, the cutting operation is carried out by both the first teeth group A and second teeth group B.

According to various experiments, it is preferable that the height difference H1 is about 0.2 mm or less although it depends on a pitch of the set tooth, a shape, a size and kinds of a workpiece, and especially when a metal is cut, a suitable value of the height difference H1 is 0.1 mm or less.

In the saw blade 1 of the first embodiment, since the saw teeth having small set amounts and the saw teeth having large set amounts have substantially the same tooth heights, although saw teeth having small set amounts function less than the saw teeth having large set amounts, the former saw teeth always carry out the cutting operation in the cutting direction. Whereas, according to the saw blade 3 of the second embodiment, when a solid material is cut, the saw teeth Ln, Rn and St of the second teeth group B do not carryout the cutting operation in the cutting direction almost at all, and most of the cutting operation is carried out by the saw teeth of the first teeth group A. Therefore, if attention is paid only to the saw teeth of the first teeth group A which carry out the cutting operation, the effective pitch is P1×2, and it looks as if the saw blade is the same as the conventional saw blade 101 shown in FIGS. 1A and 1B.

Therefore, if the cutting conditions such as a running speed and cutting load of a band mill and saw blade are set to the same conditions as those of the cutting operation by the saw blade 1 of the first embodiment, and if a solid material W is cut using the saw blade 3 of the second embodiment and the cutting time is compared, the result is saw blade 101≈saw blade 3<saw blade 1<saw blade 103. That is, as compared with the conventional saw blade 103 shown in FIGS. 2A and 2B and the saw blade 1 of the first embodiment shown in FIGS. 6A, 6B and 6C, the cutting time of the solid material by the second embodiment is improved, and is almost the same as the cutting time of the conventional saw blade 101 shown in FIGS. 1A and 1B.

Figure 7C:
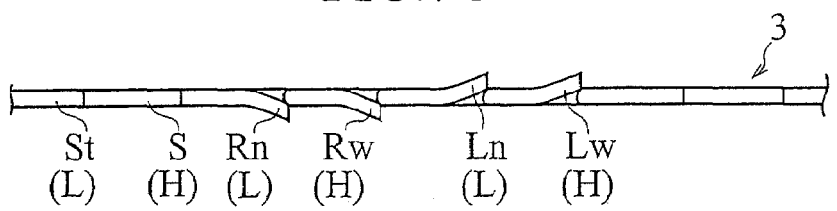
FIG. 7C is a bottom view showing a modification of the tooth pattern of the saw blade shown in FIG. 7B.

On the other hand, if a workpiece P such as a pipe material shown in FIG. 5 is cut using a saw blade 3 shown in FIGS. 7A, 7B and 7C, when the pitch P1 of the saw blade is as small as 2 mm with respect to the 3 mm thickness of the pipe material and the cutting resistance in the cutting direction is small and the cutting amount tends to be increased, i.e., when the saw blade 3 reaches near the center of the pipe material, the saw teeth of the second teeth group B also carry out the cutting operation, the workpiece P does not enter between the tips of the saw blade 3, abrupt free fall is not generated and thus, the cutting operation is carried out appropriately without breaking the teeth.

In the saw blade 3, it is possible to equally set the set amounts of the set teeth of the first teeth group A and the set teeth of the second teeth group B as shown in FIG. 7C. In this case, the cutting precision of a cutting section is enhanced by the shaving effect.

Figure 8A:
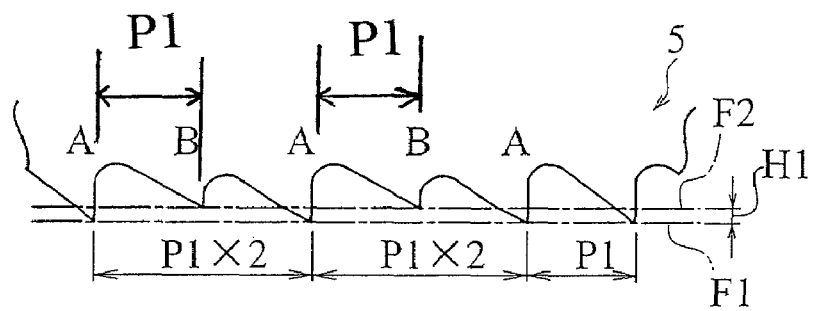
FIG. 8A is a front view showing a tooth pattern of a portion of a saw blade according to a third embodiment of the present invention.
Figure 8B:
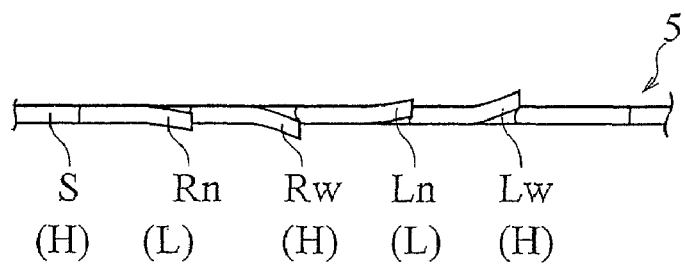
FIG. 8B is a bottom view showing the tooth pattern of the portion of the saw blade shown in FIG. 8A.

FIGS. 8A and 8B show a saw blade 5 of a third embodiment of the invention. The saw blade 5 is equal to the saw blade 3 of the second embodiment shown in FIGS. 7A, 7B and 7C from which the spur tooth St of the second teeth group B is removed, and the pitches P1 between the saw teeth are equal to each other.

More specifically, the first teeth group A comprises a total of three teeth, i.e., one spur tooth S having a high tooth height, and a pair of left and right set teeth Lw and Rw having relatively large set amounts. The second teeth group B comprises a total of two teeth, i.e., a pair of left and right set teeth Ln and Rn having a tooth height lower than the left and right set teeth Lw and Rw of the first teeth group A and having a set amount smaller than the set teeth Lw and Rw of the first teeth group A. The total five saw teeth of the combination of the saw teeth of the first teeth group A and the saw teeth of the second teeth group B constitute one set pattern.

Since the height difference H1 between the tips of the saw teeth of the first teeth group A and the saw teeth of the second teeth group B is the same as that of the saw blade 3 of the second embodiment, explanation thereof is omitted.

According to the saw blade 5 of the third embodiment, like the saw blade 3 of the second embodiment, if a solid material is cut, the set teeth Ln and Rn of the second teeth group B do not carry out the cutting operation almost at all, and the saw teeth belonging to the first teeth group A carry out the cutting operation. If attention is paid only to the saw teeth of the first teeth group A which carry out the cutting operation, although the average pitch of the saw teeth of the set pattern in the saw blade 3 of the second embodiment is 4 mm, the average pitch of the saw teeth of the set pattern of the saw blade 5 of the third embodiment is slightly smaller at about 3.3 mm [(2+4+4)/3].

Therefore, if the cutting conditions such as a running speed and cutting load of a band mill and saw blade are set to the same conditions as those of the cutting operation by the saw blades of the first and second embodiments, and if a solid material W is cut using the saw blade 5 of the third embodiment and the cutting time is compared, the result is saw blade 101≈saw blade 3<saw blade 5<saw blade 1<saw blade 103. That is, although the cutting time of the solid material is increased as compared with the saw blade 3 by a value obtained by subtracting about 3.3 mm average pitch of the first teeth group A from the 4 mm pitch of the conventional saw blade 101 shown in FIGS. 1A and 1B, the cutting time is enhanced as compared with the conventional saw blade 103 shown in FIGS. 2A and 2B and the saw blade 1 of the first embodiment shown in FIGS. 6A, 6B and 6C.

When a workpiece P such as a pipe material shown in FIG. 5 for example is cut using a saw blade 5 shown in FIGS. 8A and 8B, the same effect as that of the saw blade 3 of the second embodiment is exhibited, and the cutting operation is carried out appropriately without breaking the teeth.

Figure 9A:
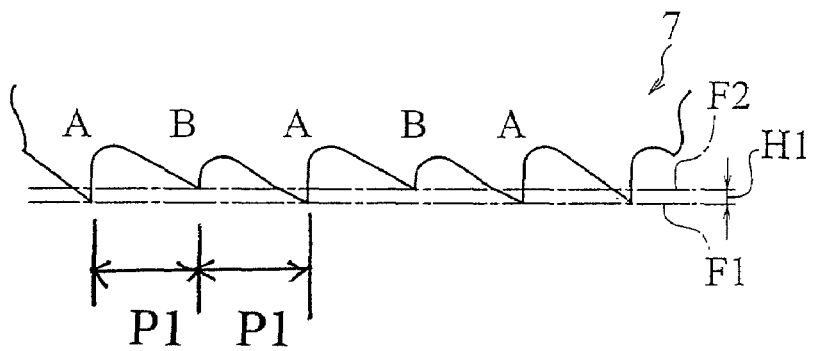
FIG. 9A is a front view showing a tooth pattern of a portion of a saw blade according to a fourth embodiment of the present invention.
Figure 9B:
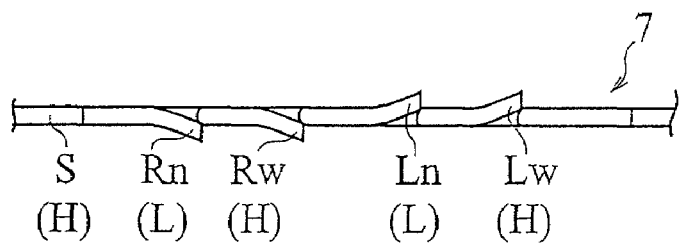
FIG. 9B is a bottom view showing the tooth pattern of the portion of the saw blade shown in FIG. 9A.

FIGS. 9A and 9B show a saw blade 7 according to a fourth embodiment of the invention. In this saw blade 7, the set amounts of the left and right set teeth Lw and Rw of the first teeth group A and the set amounts of the left and right set teeth Ln and Rn of the second teeth group B of the third embodiment shown in FIGS. 8A and 8B are substantially the same, and the pitches P1 between the saw teeth are equal to each other.

More specifically, the first teeth group A comprises a total of three teeth, i.e., one spur tooth S having high tooth height, and a pair of left and right set teeth Lw and Rw having relatively large set amounts and high tooth heights. The second teeth group B comprises a total of two teeth, i.e., a pair of left and right set teeth Ln and Rn having tooth height lower than the left and right set teeth Lw and Rw of the first teeth group A and having set amounts which are substantially equal to those of the set teeth Lw and Rw of the first teeth group A. The total five saw teeth of the combination of the saw teeth of the first teeth group A and the saw teeth of the second teeth group B constitute one set pattern.

According to the saw blade 7 of the above structure, when the cutting resistance is large and the cutting speed is relatively small like a case in which a solid material W shown in FIG. 3 is cut, the set teeth Ln and Rn having low tooth height of the second teeth group B do not carry out the cutting operation almost at all but slightly carry out the cutting operation such as to scrub a side surface of a groove which is cut by the set teeth Lw and Rw having tooth height of the first teeth group A, and the precision of the cut surface is enhanced by the shaving effect. Since the height difference H1 between the tips of the saw teeth of the first teeth group A and the saw teeth of the second teeth group B is the same as that of the saw blade 3 of the second embodiment, explanation thereof is omitted.

In the saw blade 7 of the fourth embodiment, if attention is paid only to the saw teeth of the first teeth group A which mainly carry out the cutting operation when a solid material W is cut, like the saw blade 5 of the third embodiment, the average pitch of the saw teeth of the set pattern is about 3.3 mm. Therefore, if the cutting conditions such as a running speed and cutting load of a band mill and saw blade are set to the same conditions as those of the cutting operation by the saw blades of the first, second and third embodiments, and if the cutting time when a solid material is compared, the result is saw blade 101≈saw blade 3<saw blade 5≈saw blade 7<saw blade 1<saw blade 103.

That is, although the cutting time of the solid material W is increased as compared with the conventional saw blade 103 shown in FIGS. 2A and 2B and with the saw blade 1 of the first embodiment, and the cutting time is substantially the same as that of the saw blade 5 of the third embodiment shown in FIGS. 8A and 8B.

When a workpiece P such as a pipe material shown in FIG. 5 for example is cut using a saw blade 7 shown in FIGS. 9A and 9B, the same effect as that of the saw blade 3 of the second embodiment is exhibited, and the cutting operation is carried out appropriately without breaking the teeth.

Figure 10A:
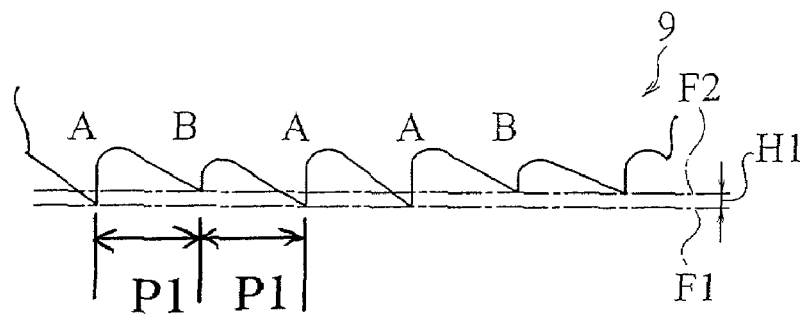
FIG. 10A is a front view showing a tooth pattern of a portion of a saw blade according to a fifth embodiment of the present invention.
Figure 10B:
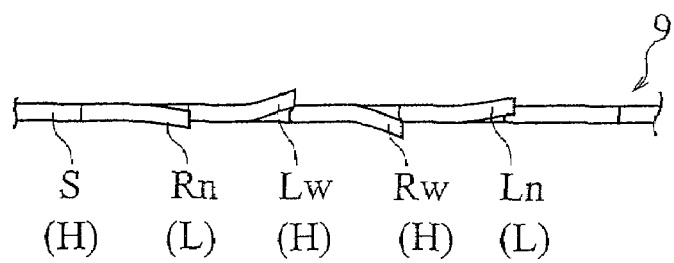
FIG. 10B is a bottom view showing the tooth pattern of the portion of the saw blade shown in FIG. 10A.

Referring to FIGS. 10A and 10B, in a saw blade 9 according to a fifth embodiment of the present invention, the order of arrangement of the left and right set teeth Lw and Rw of the first teeth group A and the left and right set teeth Ln and Rn of the second teeth group B of the saw blade 5 of the third embodiment shown in FIG. 3 are changed, and pitches P1 between the saw teeth are equal to each other. Since the saw blade 7 is almost the same as the saw blade 5 of the third embodiment shown in FIGS. 8A and 8B in function, detailed explanation is omitted.

In the saw blade 9 of the fifth embodiment, the arrangement of the left and right set teeth Lw and Rw of the first teeth group A and the left and right set teeth Ln and Rn of the second teeth group B can appropriately be changed. In this case, the left and right set teeth Lw and Rw of the first teeth group A and the left and right set teeth Ln and Rn of the second teeth group B are arranged such that the teeth set in the same direction are not continuously arranged.

Figure 11A:
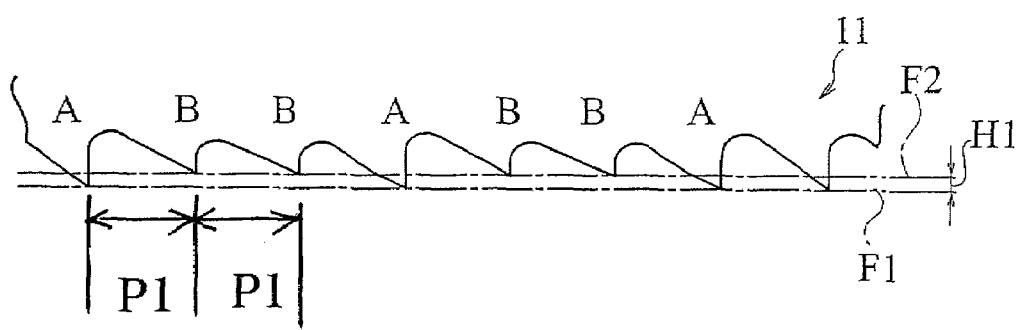
FIG. 11A is a front view showing a tooth pattern of a portion of a saw blade according to a sixth embodiment of the present invention.
Figure 11B:
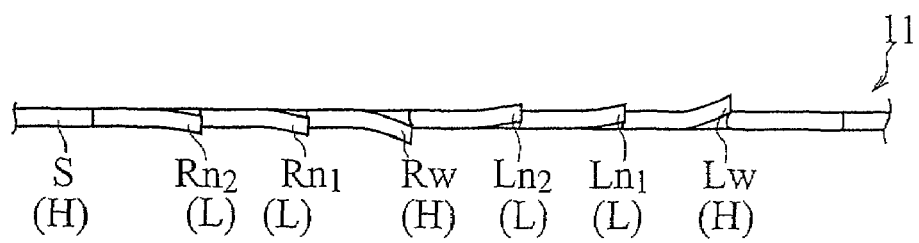
FIG. 11B is a bottom view showing the tooth pattern of the portion of the saw blade shown in FIG. 11A.

Referring to FIGS. 11A and 11B, in a saw blade 11 of a sixth embodiment of the invention, left and right set teeth $Ln_2$ and $Rn_2$ having low tooth height and small set amount are added to the second teeth group B of the saw blade 5 of the third embodiment shown in FIGS. 8A and 8B, and the number of saw teeth is increased, and the pitches P1 between the saw teeth are equal to each other.

More specifically, the first teeth group A comprises a total of three teeth, i.e., one spur tooth S having high tooth height, and a pair of left and right set teeth Lw and Rw having relatively large set amounts and high tooth heights. The second teeth group B comprises a total of four teeth, i.e., a pair of left and right set teeth $Ln_1$ and $R_{n1}$ having a tooth height lower than the left and right set teeth Lw and Rw of the first teeth group A and having set amounts which are less than those of the set teeth Lw and Rw of the first teeth group A and substantially equal to those of a pair of left and right set teeth $L_{n2}$ and $R_{n2}$. The total seven saw teeth of the combination of the saw teeth of the first teeth group A and the saw teeth of the second teeth group B constitute one set pattern. Since the height difference H1 between the tips of the saw teeth of the first teeth group A and the saw teeth of the second teeth group B is the same as that of the saw blade 3 of the second embodiment, detailed explanation thereof is omitted.

According to the saw blade 11 of the sixth embodiment, like the saw blade 5 of the third embodiment, when a solid material W is cut, the saw teeth $Ln_1$, $Ln_2$, $Rn_1$, $Rn_2$ of the second teeth group B do not carry out the cutting operation almost at all, and the saw teeth S, Lw and Rw of the first teeth group A mostly carries out the cutting operation. Therefore, if attention is paid only to the left and right set teeth Lw and Rw of the first teeth group A, the distance between the left and right set teeth Lw and Rw and a distance between the set tooth Rw and the spur tooth S are large (P1×3=6 mm), the cutting amount of the saw teeth is increased and a load of each tooth is increased correspondingly by a value of the increased pitch. Therefore, this is not preferable for a saw blade having relatively large pitch but this structure pattern is effective for a saw blade having a small pitch.

When a workpiece P such as a pipe material shown in FIG. 5 is cut using the saw blade 11 shown in FIGS. 11A and 11B, the same effect as that of the saw blade 3 of the second embodiment is exhibited, and the cutting operation is carried out appropriately without breaking the teeth.

Figure 12A:
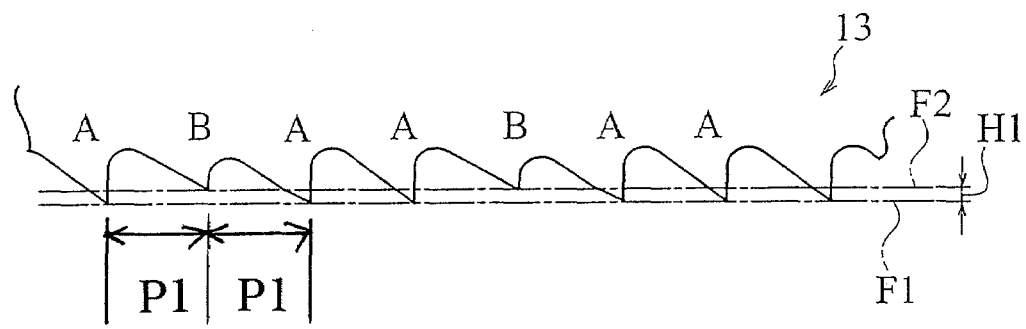
FIG. 12A is a front view showing a tooth pattern of a portion of a saw blade according to a seventh embodiment of the present invention.
Figure 12B:
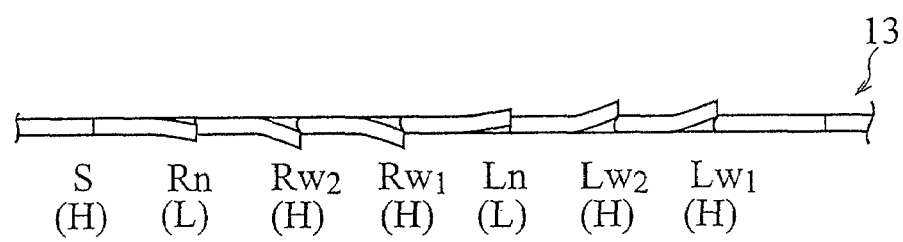
FIG. 12B is a bottom view showing the tooth pattern of the portion of the saw blade shown in FIG. 12A.

Referring to FIGS. 12A and 12B, in a saw blade 13 of a seventh embodiment of the invention, left and right set teeth $Lw_2$ and $Rw_2$ having high tooth height and relatively large set amount are added to the first teeth group A of the saw blade 5 of the third embodiment shown in FIGS. 8A and 8B, and the number of saw teeth is increased, and the pitches P1 between the saw teeth are equal to each other.

More specifically, the first teeth group A comprises a total of five teeth, i.e., one spur tooth S having high tooth height, and two pairs of left and right set teeth $Lw_1$, $Lw_2$, $Rw_1$, $Rw_2$ having relatively large set amounts and high tooth heights. The second teeth group B comprises a total of two teeth, i.e., a pair of left and right set teeth Ln and Rn having lower tooth height and smaller set amounts than the left and right set teeth Lw and Rw of the first teeth group A. The total seven saw teeth of the combination of the saw teeth of the first teeth group A and the saw teeth of the second teeth group B constitute one set pattern.

According to the saw blade 13 of the seventh embodiment, a drawback caused by the fact that the pitches of the left and right set teeth Lw and Rw of the first teeth group A of the saw blade 11 of the embodiment shown in FIGS. 11A and 11B is solved. Since the cutting effect with respect to a solid material W and a pipe material P, and the height difference H1 between the tips of the saw teeth of the first teeth group A and the saw teeth of the second teeth group B are the same as that of the saw blade 5 of the third embodiment, detailed explanation thereof is omitted. As described above, the kinds and the number of the saw teeth of the first teeth group A and the second teeth group B can appropriately be changed.

Figure 13A:
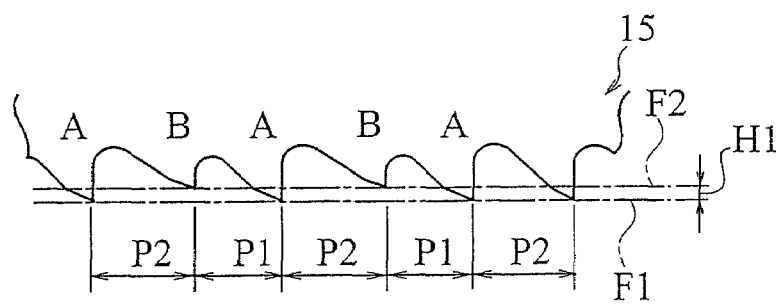
FIG. 13A is a front view showing a tooth pattern of a portion of a saw blade according to an eighth embodiment of the present invention.
Figure 13B:
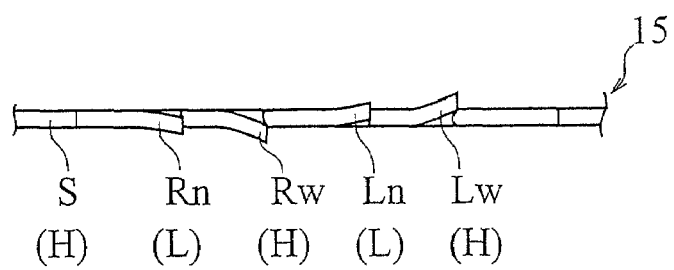
FIG. 13B is a bottom view showing the tooth pattern of the portion of the saw blade shown in FIG. 13A.

Referring to FIGS. 13A and 13B, according to a saw blade 15 of an eighth embodiment of the invention, a set pattern of a combination of the left and right set teeth Lw and Rw of the first teeth group A and the left and right set teeth Ln and Rn of the second teeth group B, and pattern of height difference of the tooth height of the third embodiment shown in FIGS. 8A and 8B are the same as those of the saw blade 5, but there are two pitch values of the saw teeth, i.e., the pitches are not equal to each other.

Since the pitch is not equal, there is a new effect that noise at the time of cutting operation can be reduced. FIG. 13A shows two pitch values P1 and p2, but if the pitch values are increased, it is possible to effectively restrain the resonance caused by vibration at the time of the cutting operation, and the cutting noise can further be reduced.

Since the cutting effect with respect to a solid material W and a pipe material P, and the height difference H1 between the tips of the saw teeth of the first teeth group A and the saw teeth of the second teeth group B are the same as that of the saw blade 5 of the third embodiment, detailed explanation thereof is omitted.

Figure 14A:
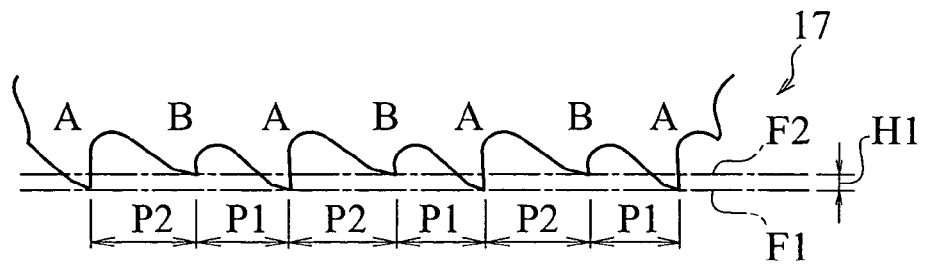
FIG. 14A is a front view showing a tooth pattern of a portion of a saw blade according to a ninth embodiment of the present invention.
Figure 14B:
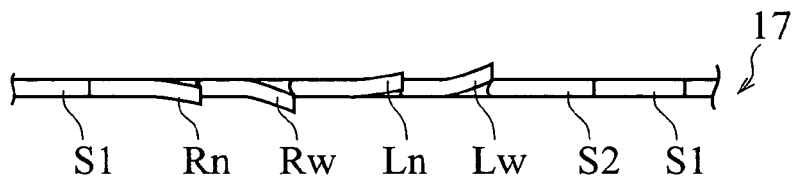
FIG. 14B is a bottom view showing the tooth pattern of the portion of the saw blade shown in FIG. 14A.

Referring to FIGS. 14A and 14B, according to a saw blade 17 of a ninth embodiment of the present invention, a set pattern is constituted by a total of six saw teeth of a combination of a first teeth group A having three teeth, i.e., a spur tooth S1 and the left and right set teeth Lw and Rw, and the second teeth group B having three teeth, i.e., a spur tooth S2 and the left and right set teeth Ln and Rn.

The tooth heights of the spur tooth S2 and the left and right set teeth Ln and Rn belonging to the second teeth group B are lower than the tooth heights of the spur tooth S1 and the set teeth Lw and Rw belonging to the first teeth group A, and the front garret of set tooth S2 belonging to the second teeth group B is shallower than the front garret of the set tooth S1 belonging to the first teeth group A as in the previous embodiments. The height difference H1 between the first teeth group A and the second teeth group B are the same as the height difference of each of the previously described saw blade. The set amounts of the left and right set teeth Ln and Rn belonging to the second teeth group B are smaller than or equal to the set amounts of the left and right set teeth Lw and Rw belonging to the first teeth group A. The teeth S1, Lw, Rw belonging to the first teeth group A and the saw teeth S2, Ln, Rn belonging to the second teeth group B are alternately arranged.

Figure 14C:
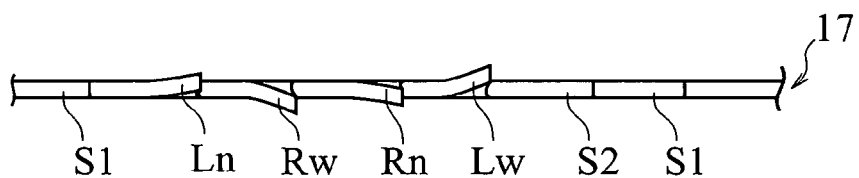
FIG. 14C is a bottom view showing a modification of the tooth pattern of the saw blade shown in FIG. 14B.

In the saw blade 17, the tip pitch P1 including garrets of the saw teeth S2, Ln, Rn belonging to the second teeth group B is smaller than the tip pitch P2 including garrets of the teeth S1, Lw, Rw belonging to the first teeth group A. The left and right set teeth Lw and Rw belonging to the first teeth group A and the left and right set teeth Ln and Rn belonging to the second teeth group B may be continuously arranged such that saw teeth which are bent in the same direction are adjacent to each other such as to pair up with each other as shown in FIG. 14B, or may be continuously arranged such that saw teeth which are bent in the different directions are adjacent to each other such as to pair up with each other as shown in FIG. 14C.

According to the saw blade 17 of the above structure, when a solid material W as shown in FIG. 3 is cut, the saw teeth S1, Lw, Rw belonging to the first teeth group A mainly contribute to the cutting operation, and when a pipe material P is cut, both the saw teeth S1, Lw, Rw belonging to the first teeth group A and saw teeth S2, Ln, Rn belonging to the second teeth group B contribute to the cutting operation, and it is possible to easily cut a solid material or pipe material.

Figure 15A:
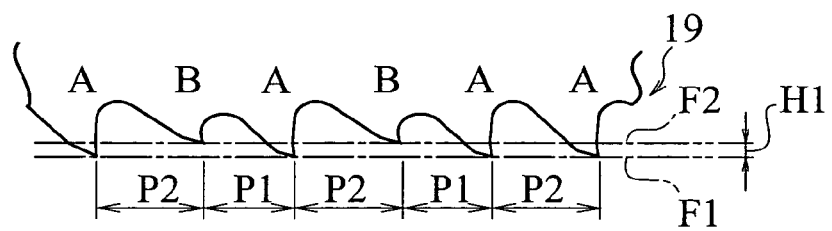
FIG. 15A is a front view showing a tooth pattern of a portion of a saw blade according to a tenth embodiment of the present invention.
Figure 15B:
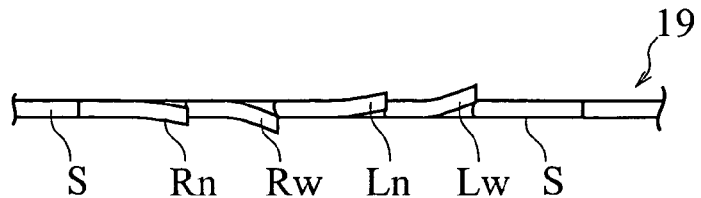
FIG. 15B is a bottom view showing the tooth pattern of the portion of the saw blade shown in FIG. 15A.

In a saw blade 19 according to a tenth embodiment of the present invention shown in FIGS. 15A and 15B, arrangement of the saw blade 19, the set pattern and saw teeth is the same as the set pattern and saw teeth of the saw blade 15 of the eighth embodiment, but a relief angle of the tip is formed in two stages to increase the garret capacity so that clogging caused by swarf is not generated easily. Further, since the cutting effect of the saw teeth belonging to the second teeth group B is smaller than the saw teeth belonging to the second teeth group A, a depth of the front garret of the saw teeth belonging to the first teeth group B is set shallower than the front garret of the saw teeth belonging to the first teeth group A, so that the structure is suitable for functions of the saw teeth.

Figure 15C:
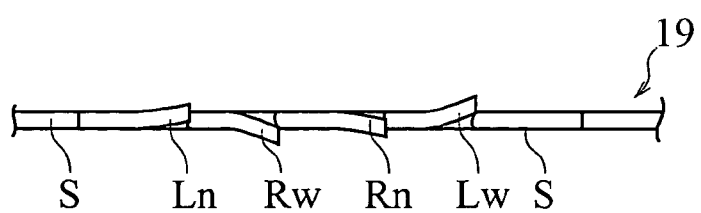
FIG. 15C is a bottom view showing a modification of the tooth pattern of the saw blade shown in FIG. 15B.

The left and right set teeth Lw and Rw belonging to the first teeth group A and the left and right set teeth Ln and Rn belonging to the second teeth group B may be continuously arranged such that saw teeth which are bent in the same direction are adjacent to each other such as to pair up with each other as shown in FIG. 15B, or may be continuously arranged such that saw teeth which are bent in the different directions are adjacent to each other such as to pair up with each other as shown in FIG. 15C.

As will be understood by explanations of the saw blades 17 and 19, the kinds and the number of saw teeth belonging to the first teeth group A are not limited, and the kinds and the number of saw teeth belonging to the second teeth group B are not limited. When a set pattern is constituted by combining the saw teeth of the first teeth group A and the saw teeth of the second teeth group B, it is preferable that the number of left set teeth and the number of right set teeth included in the set pattern are equal to each other. In the set pattern, the tip pitches are not limited to the two values, i.e., P1 and P2, and other pitches may be combined. For example, in the set pattern, all pitches may be different.

The invention claimed is:

1. A saw blade in which a set pattern of teeth is continuously repeated, wherein said set pattern comprises a combination of a first teeth group wherein the teeth all have a first tooth height and a second teeth group wherein the teeth all have a second tooth height that is different than the first tooth height, the first teeth group having a spur tooth and left and right laterally bent set teeth and the second teeth group in which all teeth are laterally bent set teeth having left and right laterally bent set teeth;
   wherein all of the teeth in the set pattern are in one of the first and second teeth groups;
   wherein set amounts of the left and right set teeth of the second teeth group are smaller than set amounts of the left and right set teeth of the first teeth group;
   wherein the number of teeth of the first teeth group is greater than the number of teeth of the second teeth group; and
   wherein the set teeth of the left and right set teeth of the first and second teeth groups which are bent in the same direction are continuously arranged.

2. A saw blade in which a set pattern of teeth is continuously repeated, wherein said set pattern comprises a combination of a first teeth group wherein the first teeth all have a first tooth height and a second teeth group wherein the teeth all have a second tooth height, the first teeth group having a spur tooth and left and right laterally bent set teeth and the second teeth group in which all teeth are laterally bent set teeth having left and right laterally bent set teeth;
   wherein all of the teeth in the set pattern are in one of the first and second teeth groups;
   wherein the second tooth height is less than the first tooth height;
   wherein set amounts of the left and right set teeth of the second teeth group are smaller than set amounts of the left and right set teeth of the first teeth group;
   wherein the number of teeth of the first teeth group is greater than the number of teeth of the second teeth group; and
   wherein the set teeth of the left and right set teeth of the first and second teeth groups which are bent in the same direction are continuously arranged.

3. A saw blade in which a set pattern of teeth is continuously repeated, wherein said set pattern comprises a combination of a first teeth group wherein the first teeth all have a first tooth height and a second teeth group wherein the teeth all have a second tooth height, the first teeth group having at least a spur tooth and a pair of left and right laterally bent set teeth and the second teeth group in which all teeth are laterally bent set teeth having at least a pair of left and right laterally bent set teeth;
   wherein all of the teeth in the set pattern are in one of the first and second teeth groups;
   wherein the second tooth height is less than the first tooth height, a tip pitch of one of the teeth of the second teeth group is smaller than a tip pitch of one of the teeth of the first teeth group, set amounts of the left and right set teeth of the second teeth group are equal to or smaller than set amounts of the left and right set teeth of the first teeth group;
   wherein the number of teeth of the first teeth group is greater than the number of teeth of the second teeth group; and
   wherein the set teeth of the left and right set teeth of the first and second teeth groups which are bent in the same direction are continuously arranged.

4. A saw blade according to claim 3, wherein a height difference between the first tooth height and the second tooth height is 0.2 mm or less.

5. A saw blade according to claim 4, wherein
   a bottom of a garret of one of the teeth of the second teeth group is located closer to a tip than a garret of one of the teeth of the first teeth group.

* * * * *